April 4, 1967 G. MON ET AL 3,312,237
BICUSPID HEART VALVE
Filed May 6, 1964
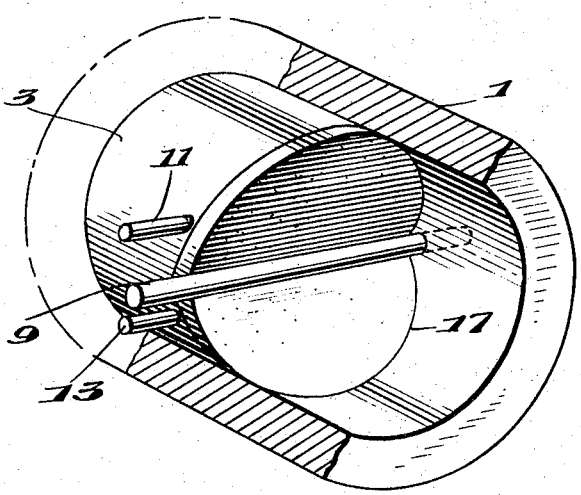
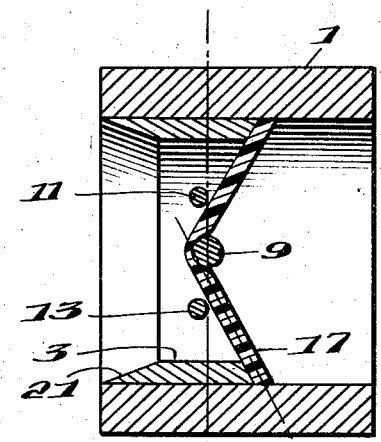
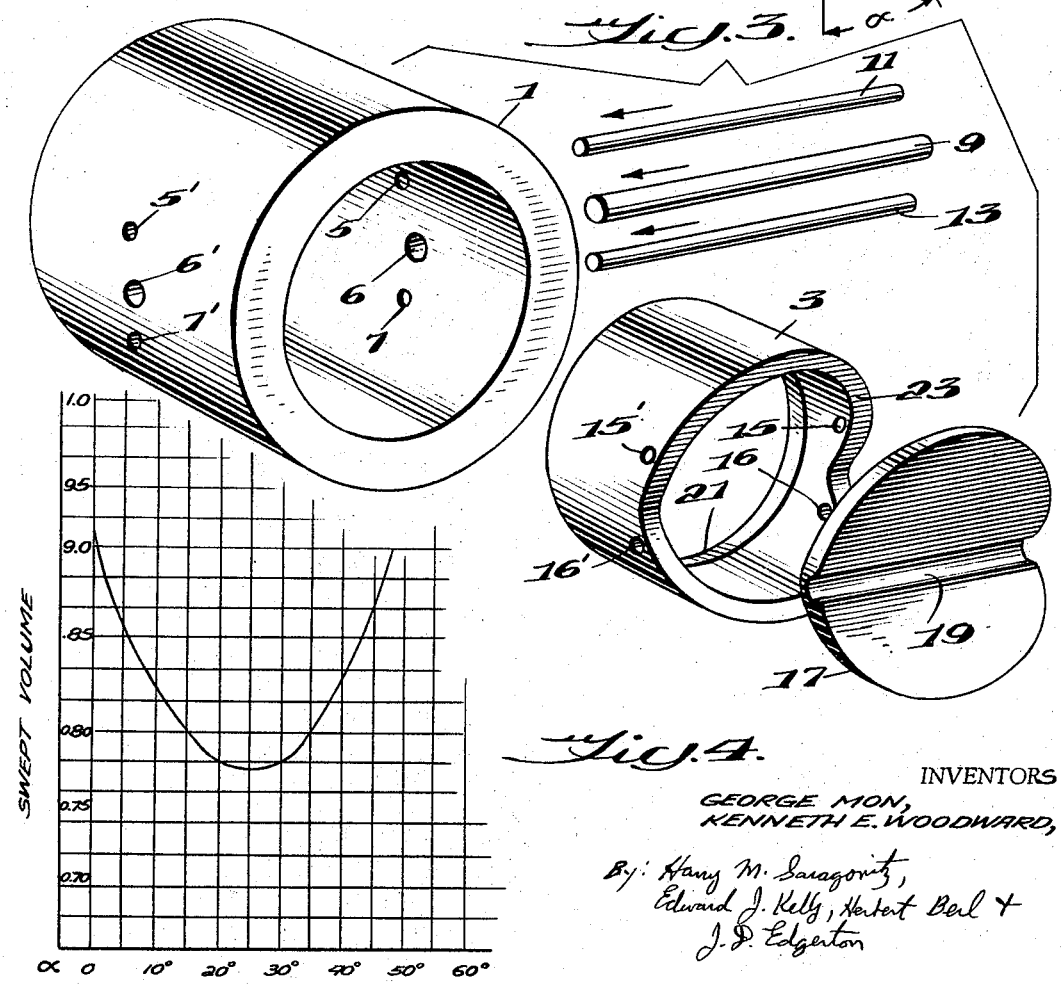
INVENTORS
GEORGE MON,
KENNETH E. WOODWARD,
By: Harry M. Saragovitz,
Edward J. Kelly, Herbert Berl &
J. D. Edgerton

3,312,237
BICUSPID HEART VALVE

George Mon, Washington, D.C., and Kenneth E. Woodward, McLean, Va., assignors to the United States of America as represented by the Secretary of the Army
Filed May 6, 1964, Ser. No. 365,541
3 Claims. (Cl. 137—512.15)

The invention described herein may be manufactured and used by or for the Government of the United States of America for governmental purposes without payment to us of any royalty thereon.

This invention relates to fluid valves, and more particularly to a flapper valve for use in a fluid line to permit fluid flow in one direction and prevent fluid flow in the opposite direction.

Artificial heart pumps have been developed to simulate the action of the human heart. While these pumps are presently used to replace the function of the heart during short periods of time, such as during an operation, medical researchers are looking forward hopefully to the day when the compactness and reliability of the artifical heart pump will be developed to the point that defective hearts can be replaced permanently. A problem encountered in developing an artificial heart pump which can be used to pump blood for an extended period of time is that of hemolysis. Hemolysis is the dissolution of red blood corpuscles with the liberation of their hemoglobin. This action results from induced turbulence and the movements of the various mechanical parts of the pump and valves.

A critical component in the operation of an artificial heart pump is the fluid valve which must operate faultlessly for an indefinite period of time with a mechanical action that does not produce excessive hemolysis. In the past various forms of flexible tricuspid valves, ball valves and "butterfly" or flapper valves have been proposed. While a high degree of reliability can be expected from many of these, the rate of hemolysis present in such structures is higher than desirable in a valve required to operate indefinitely in a closed system. Also, the design of many of the prior art valves has required that extremely close mechanical tolerances be maintained in order to prevent regurgitation (back flow) during the period in which the valve is closed.

Accordingly, it is an object of the present invention to provide a flapper valve for use in controlling the flow of blood without excessive hemolysis or regurgitation.

Another object of the invention is the provision of a flapper valve in which movement is limited to a single member whose physical configuration is such as to restrict the extent of movement to predetermined limits.

Another object of the invention is the provision of a flexible valve that seals without friction and has sufficient support to prevent seizure.

A further object of the invention is the provision of a flapper valve of inexpensive construction in which the dimensioning of parts need not be held to the critical tolerances required previously.

These objects and features are realized in a valve comprising a unitary resilient flapper member mounted within a valve holder by three pins. The valve holder is made up of inner and outer hollow cylindrical sleeves. One end of the inner sleeve is chamfered to reduce the resistance to fluid flow, and the other end has a V-shaped notch therein which serves as a valve seat for the resilient flapper member. The resilient flapper member is elliptical in shape, and has a groove forming a thinner section along its minor axis which acts as a hinge. The rseilient flapper member is held within the sleeves by a transversely mounted center pin serving as a hinge member, and two transversely mounted support pins which prevent collapse of the valve when pressure is exerted in the closed position. When used as a heart valve, blood will flow freely in one direction as the resilient flapper member is forced together by the fluid flow, thereby opening the passageway. When the fluid flow attempts to reverse, the resilient flapper member is forced against the V-shaped periphery of the inner sleeve member thereby stopping the flow.

The foregoing and other objects, features and advantages of the invention will be apparent from the following more particular description of a preferred embodiment of the invention, as illustrated in the accompanying drawings, in which:

FIG. 1 is a perspective view of the flapper valve of the present invention with portions broken away to show the interior details;

FIG. 2 is across-section view of the valve shown in FIG. 1;

FIG. 3 is an exploded perspective view showing each of the separate parts of the valve of FIG. 1; and FIG. 4 is a graphical illustration of how the swept volume of the flapper member varies with changes in the angle $\alpha$ shown in FIG. 2.

In FIG. 1 the valve is shown as comprising an outer hollow cylindrical sleeve member 1 which encloses the remainer of the valve parts. Mounted within the outer sleeve member 1 is an inner hollow cylindrical sleeve member 3 which forms a press-fit within the outer sleeve to prevent leakage of fluid between the sleeves. The outer sleeve member 1 has three sets of aligned holes shown in FIG. 3 of the drawings by the numerals 5 to 7 and 5' to 7'. These holes accommodate the center pin member 9 and the two support pin members 11 and 13. Support pin members 11 and 13 also pass through holes 15 and 16 and 15' and 16' in the inner sleeve member 3.

A resilient flapper member 17, which is elliptically shaped, is provided with a groove 19 along its minor axis to permit the flapper 17 to hinge about the center pin 9. It will be noted from FIG. 2 that the groove 19 is dimensioned so that the surrounding walls of the groove serve as a limit stop against the center pin 9 to prevent the flapper member 17 from folding completely about the center pin 9 and striking itself.

The inner sleeve member 3 is provided with a chamfered edge 21 to reduce the resistance to fluid flow and prevent turbulence in the operation of the valve. The end of the inner sleeve member 3 opposite the chamfered edge 21 is generally V-shaped, and the peripheral portion 23 of this V-shaped notch forms the valve seat for the resilient flapper member 17.

The efficiency of the flapper valve of the present invention is dependent upon a number of factors, such as the initial flapper angle $\alpha$, the volume swept by the flapper in opening, the geometry of the flow passage, the surface finish, etc. Laboratory tests have shown that the volume swept by the flapper plays a dominant role in valve efficiency. A flapper valve which has a minimum flapper swept volume for a given flow will have the highest efficiency. FIG. 4 shows a graph of the swept volume versus the initial flapper angle α. It will be seen from this graph that the minimum swept volume occurs at an initial flapper angle of approximately 25°. The probable usable range within consideration of allowable efficiencies occurs with flapper angles varying from 10° to 40°.

Average test results of valves constructed in accordance with the present invention as compared with conventional ball valves and conventional tricuspid valves are shown in the table below.

|  | Flow in liters/minute | I.H.* | No. Trials |
|---|---|---|---|
| Flapper valves | 1.5 | 0.08 | 8 |
|  | 2.0 | 0.18 | 13 |
|  | 3.5 | 0.09 | 6 |
| Ball Valves | 2.0 | 0.54 | 9 |
| Tricuspid Valves | 2.0 | 0.55 | 5 |

*I.H.=Index of Hemolysis=grams of hemoglobin liberated per 100 liters pumped.

It will be seen from the table above that the hemolysis produced by the valves constructed in accordance with the principles of the present invention is much lower than that produced by conventional valves currently in use.

The sleeve and pin members of the valve are constructed preferably of stainless steel. The resilient flapper member is constructed of a suitable plastic such as an ethylene polymer. A primary consideration in the type of plastic used is its fatigue resistance, since the groove 19 along the minor axis of the flapper produces a section of reduced thickness which is subjected to repeated bendings.

The relatively large valve seat area provided by the peripheral face 23 of the notch in the inner sleeve 3 allows a much greater latitude in the dimensional tolerances of the valve parts, and virtually assures that a proper seal will be effected. The support pin members 11 and 13 serve to hold the flapper member 17 in position and provide the required reinforcement when back pressures are applied to flapper 17 which would tend to collapse the valve.

The chamfered edge 21 reduces the turbulence of flow, thereby minimizing hemolysis, and the design of the groove member 19, which prevents the flapper 17 from folding upon itself and producing a mechanical beating action, also minimizes the hemolysis action.

While the invention has been shown and described with particular reference to a preferred embodiment, it will be understood by those skilled in the art that various changes in form and details may be made without departing from the spirit and scope of the invention.

What is claimed is:

1. A fluid valve comprising a hollow cylindrical member, a center pin member mounted transversely within said cylindrical member, first and second support pins mounted transversely within said cylindrical member and a resilient flapper member extending around said center pin member, whereby fluid flow in one direction forces said flapper member to bend around said center pin toward the longitudinal axis of said cylindrical member to allow the passage of fluid through the valve, while fluid flow in the opposite direction forces said flapper member outwardly toward said cylindrical member to form a seal thereagainst with intermediate support for said flapper member being provided by said first and second support pins, a second hollow cylindrical member mounted within said first mentioned cylindrical member to form a valve seat for said resilient member, one end of said second hollow cylindrical member is chamfered to reduce fluid turbulence, the other end of said second hollow cylindrical member is of complementary shape to said resilient flapper member to form an end seal with said flapper member, said resilient flapper member is elliptical in shape with a groove extending thereacross along the minor axis to accomodate said center pin member, said groove being shaped to serve as a limit stop against said center pin member to prevent the resilient flapper member from folding completely about said center pin member and striking against itself.

2. The combination according to claim 1 wherein an angle is formed by said resilient flapper member and a plane transverse of said second hollow cylindrical member, said angle being within the range of 10° to 40°.

3. The combination according to claim 1 wherein said angle is approximately 25°.

References Cited by the Examiner

UNITED STATES PATENTS

| 2,292,003 | 8/1942 | Yant | 137—512.15 |
| 2,505,757 | 5/1950 | Dunbar | 137—525.1 X |
| 2,922,437 | 1/1960 | Rippingille | 137—515.7 X |

FOREIGN PATENTS

| 794,511 | 5/1958 | Great Britain. |

OTHER REFERENCES

Grott, V. L.: Replacement of the Canine Pulmonary Valve and Pulmonary Artery with a Graphite-Coated Valve Prosthesis, Valve Prosthesis, vol. 44, No. 6, December 1962, page 714, 3/1 HV Digest.

WILLIAM F. O'DEA, *Primary Examiner.*

HAROLD WEAKLEY, *Assistant Examiner.*